US006595604B1

(12) United States Patent
Peterson

(10) Patent No.: US 6,595,604 B1
(45) Date of Patent: Jul. 22, 2003

(54) TRAY SUPPORT SYSTEM FOR A BAG

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/072,019

(22) Filed: Feb. 7, 2002

(51) Int. Cl.[7] ................................................. E04H 1/14
(52) U.S. Cl. ............................... 312/3; 190/9; 190/110; 220/528
(58) Field of Search .......................... 190/9, 13 H, 33, 190/35, 110, 113; 312/3, 4, 236, 351; 220/558, 529, 528; 224/920; 206/561

(56) References Cited

U.S. PATENT DOCUMENTS

| | | | | |
|---|---|---|---|---|
| 558,432 A | * | 4/1896 | Sonn | 206/292 |
| 2,005,791 A | * | 6/1935 | Kruse | 312/209 |
| 2,792,980 A | * | 5/1957 | Brown | 224/633 |
| 2,870,904 A | * | 1/1959 | Tarbox | 312/273 |
| 3,186,529 A | * | 6/1965 | Gilbert | 312/244 |
| 3,759,356 A | * | 9/1973 | Bostick et al. | 190/111 |
| 4,400,043 A | * | 8/1983 | Rossow | 312/111 |
| 5,090,526 A | * | 2/1992 | Jacober | 190/107 |
| 5,630,537 A | * | 5/1997 | Sciacca | 224/629 |
| 5,769,221 A | * | 6/1998 | Cyr | 206/316.1 |
| 5,988,476 A | * | 11/1999 | Olerio | 224/630 |
| 6,213,268 B1 | * | 4/2001 | Dancyger | 190/110 |
| 6,435,390 B1 | * | 8/2002 | Abramowicz | 224/629 |

* cited by examiner

Primary Examiner—Korie Chan
(74) Attorney, Agent, or Firm—Sturm & Fix LLP

(57) ABSTRACT

A tray support system for a bag having an internal compartment with an access opening in the front wall. The tray support system includes a pair of opposing tray support brackets attached to opposing vertical side walls of the internal compartment. Each of the pair of brackets has a plurality of ledges that are horizontally aligned to form complementary ledges that receive and support the outer edges of a tray. The tray support brackets may be releasably attached directly to the side walls of the compartment, or attached to rigid inserts which are in turn attached to the side walls. When the trays are not in use, the space in the compartment is substantially unobstructed and can be used to store various items. Also, the brackets and inserts are easily and conveniently removably so that the bag may be folded for storage.

4 Claims, 2 Drawing Sheets

TRAY SUPPORT SYSTEM FOR A BAG

BACKGROUND OF THE INVENTION

1. Field of the Invention

The present invention relates to the field of bag accessories, and more particularly to a removable tray support system for a bag.

2. Description of Related Art

The prior art is replete with myriad and diverse tray support systems for bags, but none provide a system that can be broken down or removed to maximize the usable space when the trays are not in use.

While all of the aforementioned prior art constructions are more than adequate for the basic purpose and function for which they have been specifically designed, they are uniformly deficient with respect to their failure to provide a simple, efficient, and practical removable tray support system for a bag.

As a consequence of the foregoing situation, there has existed a longstanding need for a new and improved tray support system for a bag, and the provision of such a construction is a stated objective of the present invention.

BRIEF SUMMARY OF THE INVENTION

Briefly stated, the present invention provides a tray support system for a bag having an internal compartment with an access opening in the front wall. The tray support system includes a pair of opposing tray support brackets attached to opposing vertical side walls of the internal compartment. Each of the pair of brackets has a plurality of ledges that are horizontally aligned to form complementary ledges that receive and support the outer edges of a tray. The tray support brackets may be releasably attached directly to the side walls of the compartment, or attached to rigid inserts which are in turn attached to the side walls. When the trays are not in use, the space in the compartment is substantially unobstructed and can be used to store various items. Also, the brackets and inserts are easily and conveniently removably so that the bag may be folded for storage.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
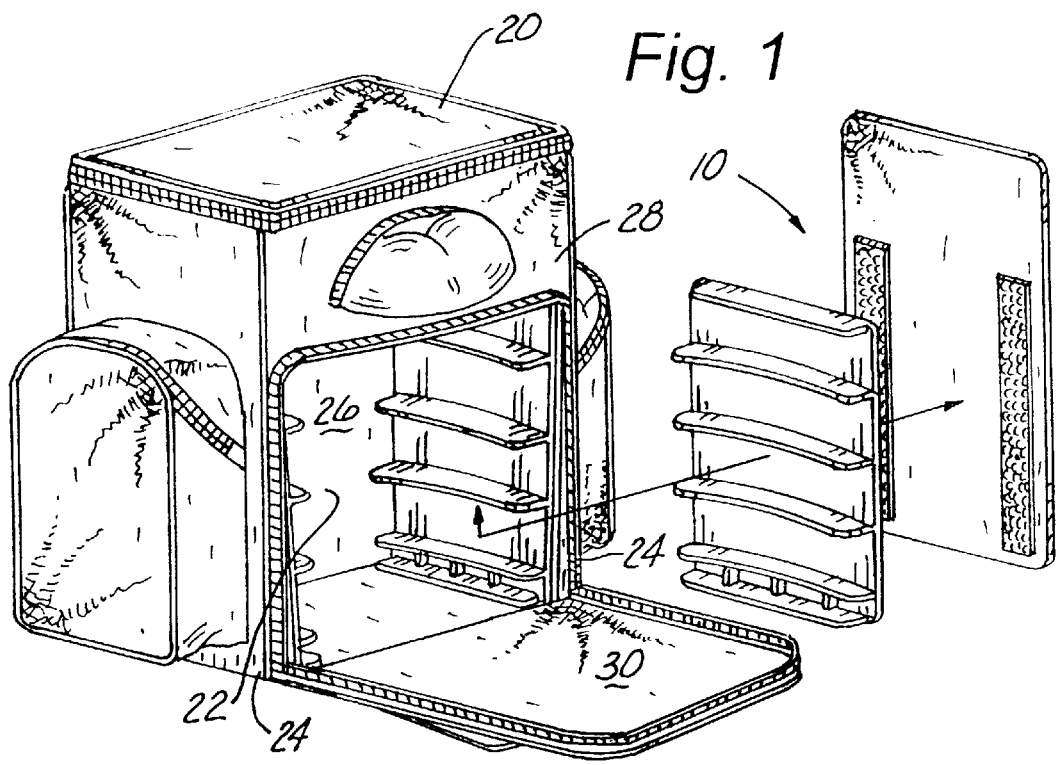
FIG. 1 is an exploded perspective view showing one of the tray support brackets and its associated rigid insert removed from the internal compartment of the bag.

As can be seen by reference to the drawings, and in particular to FIG. 1, the tray support system that forms the basis of the present invention is designated generally by the reference number 10.

The tray support system 10 is used in a bag 20 that has an internal compartment 22 defined by a pair of vertical side walls 24, a rear wall 26, and a front wall 28. The front wall 28 includes an access door 30 that is secured in a closed position by a zipper mechanism, and that is downwardly and outwardly pivotable to an open position shown in FIG. 1. It is to be understood that the access door 30 could also be designed to pivot upwardly or to the side.

A pair of tray support brackets 40 each include a back plate 42 and a number of ledges 44 that extend out from the back plate 42. The brackets 40 may be directly attached to the side walls 24 by hook and loop fasteners 50, or they may be attached to rigid inserts 60 that are in turn attached to the side walls 24. The lowermost ledge 44 of the brackets 40 is spaced up from the bottom of the back plate 42 to provide clearance when the access door 30 is in the open position shown in FIG. 1. It is to be understood that this bottom spacing will not be required if the access door 30 is designed to open upwardly or to the side.

Figure 2:
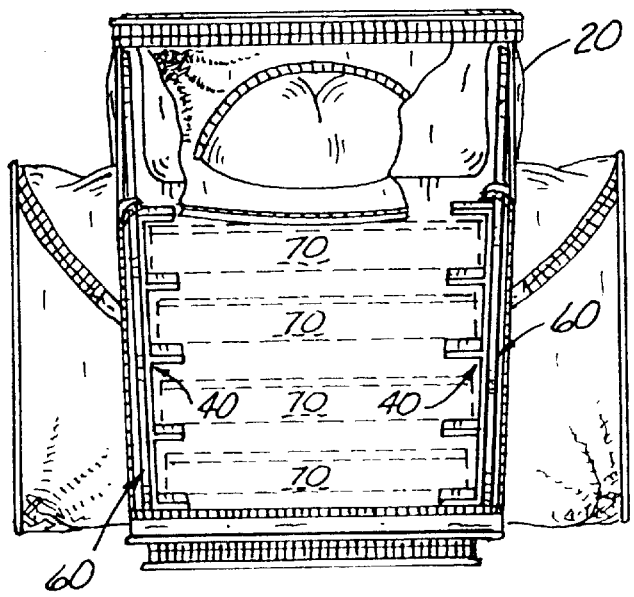
FIG. 2 is a front elevational view with portions cut away to show the tray support system.
Figure 3:
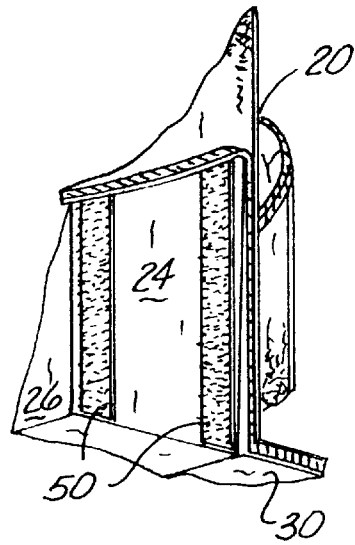
FIG. 3 is a partial perspective view showing one of the vertical side walls of the internal compartment.
Figure 4:
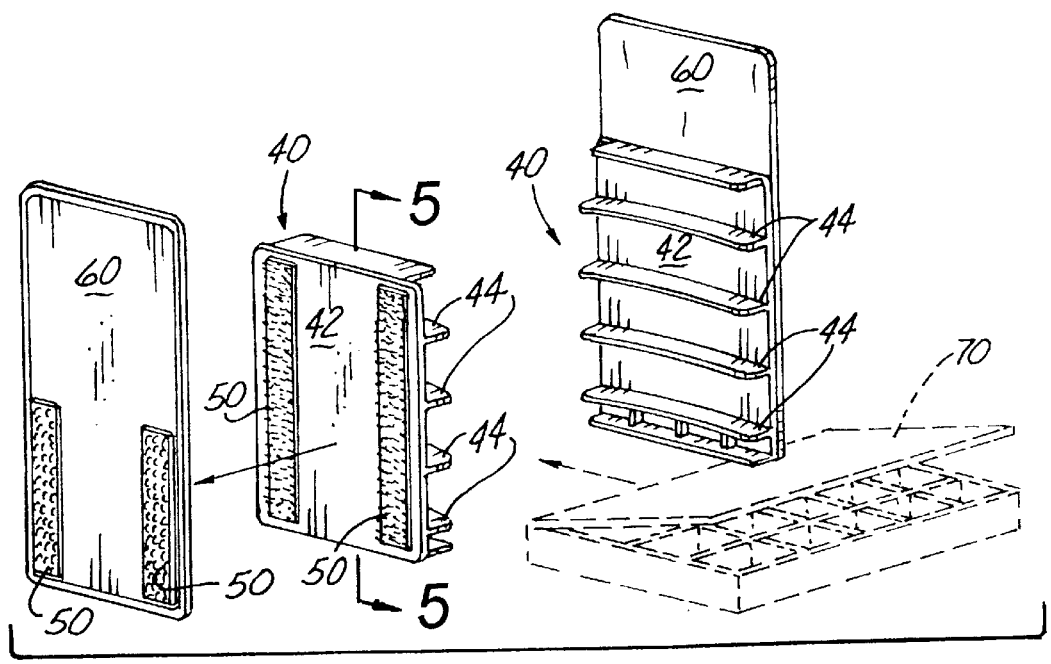
FIG. 4 is an exploded perspective view illustrating the arrangement of the pair of opposing tray support brackets, their associated rigid inserts, and a tray.
Figure 5:
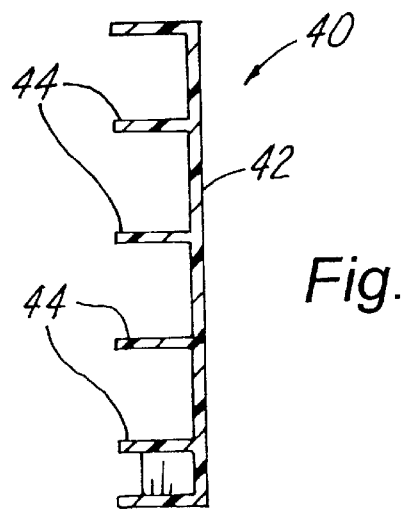
FIG. 5 is a sectional view taken along line 5—5 of FIG. 4.

As shown in FIGS. 1, 2, and 4, the brackets 40 are installed in the compartment 22 so that the ledges 44 are horizontally aligned to form complementary pairs that receive and support the outer edges of trays 70.

It can be seen that the brackets 40 and inserts 60 may be easily installed or removed as desired. When the trays 70 are not being used the space within the compartment 22 is substantially unobstructed and usable for storage of items of various sizes. Also, the bracket 40 and inserts 60 may be removed so that the bag 20 may be folded for initial shipment to the customer, or for storage when not in use. When used with the trays 70, items such as fishing tackle, hardware, sewing supplies, or other small items may be conveniently carried.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A tray support system, comprising:
   a bag having an internal compartment defined by a pair of vertically disposed horizontally spaced side walls, a vertically disposed rear wall interconnecting the sidewalls, and a vertically disposed front wall horizontally spaced from the rear wall and including a selectively closeable access opening;

a pair of opposing tray support brackets, each bracket including a back plate, and a plurality of ledges attached to and extending out from the back plate, the back plate of each bracket being removably attached to one of the side walls such that the ledges of one of the pair of brackets are horizontally aligned with the ledges of the other of the pair of brackets to form a complementary pair of ledges disposed to receive and support outer edges of a tray wherein each of the bracket back plates is attached to a rigid insert which is in turn attached to one of the side walls.

2. The tray support system of claim 1 wherein the access opening includes a panel that pivots downwardly and outwardly from the front wall to an open position, and wherein each of the brackets includes a lowermost ledge spaced above the panel when it is in the open position.

3. The tray support system of claim 1 wherein the bracket back plates are attached to the rigid inserts by hook and loop fasteners.

4. The tray support system of claim 3 wherein the rigid inserts are attached to the side walls by hook and loop fasteners.

* * * * *